United States Patent Office 2,932,661
Patented Apr. 12, 1960

2,932,661
STABILIZED COMPOSITIONS OF POLYMERIZABLE MONOMERS

Charles H. Campbell and Lloyd T. Jenkins, Decatur, Ala., assignors to The Chemstrand Corporation, Decatur, Ala., a corporation of Delaware No Drawing. Application April 9, 1957
Serial No. 651,597

9 Claims. (Cl. 260—465.9)

This invention relates to stabilized compositions comprising monomeric polymerizable compounds. More particularly the invention is concerned with stabilized compositions of acrylonitrile or acrylate esters and to the method of preparing the same.

It is well known that monomeric acrylonitrile and acrylate esters will polymerize upon standing at room temperature or when exposed to heat and/or light. For example, acrylonitrile which is a colorless liquid, polymerizes to a cloudy solution when stored at room temperature or when heated at elevated temperatures for short periods of time. It will also polymerize when subjected to ultraviolet light.

Storage and shipment of acrylonitrile and acrylate esters have presented difficult problems because of this tendency toward polymerization under normal storage and shipping conditions. In order to overcome these difficulties a number of substances have been proposed heretofore as inhibitors for the polymerization of these compounds. However, many of the prior art inhibitors are too expensive for commercial use, since they do not have the property of inhibiting polymerization to a sufficiently practical degree, and they result in objectionable color when in the oxidized state. Among such inhibitors known to the art are hydroquinone, tertiary butylcatechol, para-methoxy phenol, diphenylamine and many others.

It is, therefore, an object of the instant invention to provide new polymerization inhibitors for acrylonitrile and acrylate esters. Another object of the invention is to provide new polymerization inhibitors which are colorless in the oxidized state. A still further object of the present invention is to provide compositions comprising acrylonitrile or acrylate esters stabilized against polymerization under normal storage and shipping conditions. Still another object of the present invention is to provide a method for inhibiting the polymerization of acrylonitrile and acrylate esters when they are subjected to heat and/or light.

In general, the objects of the present invention are accomplished by incorporating tri-phenyl phosphite or tri-p-tolyl phosphite into monomeric acrylonitrile or acrylate esters at a temperature in the range extending from the melting point of the monomeric compound up to a temperature not exceeding the boiling point of the monomeric compound.

It is surprising that tri-phenyl phosphite and tri-p-tolyl phosphite are excellent stabilizers for acrylonitrile and the acrylate esters. This is particularly so in view of the fact that they do not inhibit polymerization of other vinyl compounds such as styrene and methyl vinyl pyridine.

The tri-phenyl phosphite and tri-p-tolyl phosphite may be used in a range of 0.01 to 10.0 percent, based on the total weight of the monomeric compound employed. However, it is preferred that the polymerization inhibitor be employed in a range of 0.5 to 2.0 percent, based on the total weight of the monomer. While a polymerization inhibitor of this invention may be incorporated into the monomeric compounds at a temperature in the range extending from the melting point of the monomeric compound up to a temperature not exceeding the boiling point of the monomeric compound, as a practical matter, it is normally dissolved in the monomeric compound at temperatures of 20 to 30° C. The polymerization inhibitor is added directly to the monomeric compound. To insure complete solution, the mixture may be stirred. However, stirring is not necessary to effect solution.

Among the acrylate esters which are stabilized against polymerization by the compounds employed in this invention are those having the general formula,

wherein R is hydrogen or a methyl radical and R' is an aliphatic hydrocarbon radical containing 1 to 8 carbon atoms, for example, methyl acrylate, ethyl acrylate, propyl acrylate, butyl acrylate, amyl acrylate, hexyl acrylate, heptyl acrylate, octyl acrylate and their isomers; methyl methacrylate, ethyl methacrylate, propyl methacrylate, butyl methacrylate, amyl methacrylate, hexyl methacrylate, heptyl methacrylate, octyl methacrylate and their isomers. Thus, it is seen that R' is a saturated aliphatic hydrocarbon radical.

In the experiments recorded in the examples and the tables, the monomers were subjected to ultraviolet light at about 60° C. for varying periods of time and with varying percentages of inhibitor present with each monomer. In order to indicate whether any polymerization had taken place 1 cc. samples of the monomers were diluted with 10 cc. of a solvent which is a non-solvent for the polymers. A haze or cloudiness in the test solution indicated the presence of polymer. Where acrylonitrile was used, the presence of polymer was indicated by a clouding of the monomeric solution, since the polymer is insoluble in the monomer.

The following examples are intended to illustrate the new compositions of the invention more fully, but are not intended to limit the scope of the invention, for it is possible to effect many modifications therein. In the examples, all parts and percents are by weight unless otherwise indicated.

EXAMPLE I 20 cc. (16.0 grams) of freshly distilled monomeric acrylonitrile was mixed together at room temperature with varying amounts of tri-phenyl or tri-p-tolyl phosphite. The samples were mounted on a rotating turntable and exposed equally to ultraviolet lamps at about 60° C. Like samples were prepared in the same manner but with 20 cc. (18.1 grams) of styrene in place of acrylonitrile. In order to determine the presence of polymer in the styrene samples, they were dissolved in petroleum ether which is a non-solvent for polystyrene. Cloudiness in the solutions indicated the presence of polymer. The results of the treatment under ultraviolet light are shown below.

Table I

| Monomer | Inhibitor | Percent Concentration based on Polymer Weight | Hours to Show Polymer |
|---|---|---|---|
| Acrylonitrile | None | 0.10 | 0.25. |
| Do | Tri-phenyl phosphite | 0.10 | 0.50. |
| Do | do | 0.25 | 2.67. |
| Do | do | 0.50 | 45.75. |
| Do | do | 1.00 | none after 50 hrs. |
| Do | Tri-p-tolyl phosphite | 0.05 | 0.92. |
| Do | do | 0.10 | 2.12. |
| Do | do | 0.50 | none after 50 hrs. |
| Do | do | 1.00 | Do. |
| Styrene | None |  | 0.5. |
| Do | Tri-phenyl phosphite | 1.0 | 0.5. |
| Do | do | 0.5 | 0.5. |

The data in the table clearly indicate that tri-phenyl phosphite and tri-p-tolyl phosphite are excellent inhibitors for acrylonitrile. No color was noticeable in the stabilized acrylonitrile. Styrene, however, is not inhibited against polymerization with these compounds. It may be seen from the table that styrene containing the inhibitors showed the presence of polymer after 0.5 hour.

EXAMPLE II 20 cc. (19.1 grams) samples of methyl acrylate, freshly distilled and containing varying amounts of tri-phenyl phosphite or tri-p-tolyl phosphite were exposed equally to ultraviolet lamps at about 60° C. In order to determine the presence of polymer in the methyl acrylate samples, they were dissolved in petroleum ether which is a non-solvent for the polymer. Like samples were prepared in the same manner but with 20 cc. (18.1 grams) of styrene in place of methyl acrylate. Cloudiness in the solutions indicated the presence of polymer. The results are set forth in the table below.

Table II

| Monomer | Inhibitor | Percent Concentration based on Polymer Weight | Hours to Show Polymer |
|---|---|---|---|
| Methyl acrylate | None | | 2.5. |
| Do | Tri-phenyl phosphite | 0.5 | none after 40 hrs. |
| Do | do | 1.0 | Do. |
| Styrene | None | | 0.5. |
| Do | Tri-phenyl phosphite | 1.0 | 0.5. |
| Do | do | 0.5 | 0.5. |

The resulting data clearly indicate that tri-phenyl phosphite is an excellent stabilizer for methyl acrylate. No color was noticeable in the stabilized methyl acrylate. On the other hand, no stabilizing effect is shown with styrene and the presence of polymer is indicated in a period of 0.5 hour.

EXAMPLE III 20 cc. (18.0 grams) of freshly distilled monomeric n-butyl methacrylate was mixed together at room temperature with varying amounts of tri-phenyl phosphite or tri-p-tolyl phosphite. These samples were mounted on a rotating turntable and exposed equally to ultraviolet lamps at about 60° C. Like samples were prepared but containing, however, styrene in the presence of the inhibitor. The monomeric mixtures were tested for polymer by adding 1 cc. of a mixture to 10 cc. of petroleum ether which is a non-solvent for the polymers. Cloudiness in the solutions indicated the presence of polymer. The results are set forth in the table below.

Table III

| Monomer | Inhibitor | Percent Concentration based on Polymer Weight | Hours to Show Polymer |
|---|---|---|---|
| n-butyl methacrylate | None | | 3.0. |
| Do | Tri-phenyl phosphite | 0.5 | 6.0. |
| Do | do | 1.0 | none after 40 hrs. |
| Do | Tri-p-tolyl phosphite | 0.5 | Do. |
| Do | do | 1.0 | Do. |
| Styrene | None | | 0.5. |
| Do | Tri-phenyl phosphite | 1.0 | 0.5. |
| Do | do | 0.5 | 0.5. |

The data above clearly show that n-butyl methacrylate is stabilized against polymerization by both tri-phenyl phosphite and tri-p-tolyl phosphite. No color was noticeable in the stabilized n-butyl methacrylate. However, styrene stabilized with tri-phenyl phosphite showed polymer after 0.5 hour.

EXAMPLE IV 20 cc. samples of methyl vinylpyridine, freshly distilled and containing varying amounts of tri-phenyl phosphite or tri-p-tolyl phosphite were exposed at a temperature of 80° C. in an oven. The presence of polymer was indicated by cloudiness in a solution of 10 cc. of petroleum ether containing 1 cc. of methyl vinylpyridine which was treated with the stabilizers and then exposed to heat.

Table IV

| Monomer | Inhibitor | Percent Concentration based on Polymer Weight | Hours to Show Polymer |
|---|---|---|---|
| Methyl vinylpyridine | None | | 1.0 |
| Do | Tri-phenyl phosphite | 0.5 | 1.0 |
| Do | do | 1.0 | 1.0 |
| Do | Tri-p-tolyl phosphite | 0.5 | 1.0 |
| Do | do | 1.0 | 1.0 |

The data in the table clearly indicate that tri-phenyl phosphite and tri-p-tolyl phosphite have no inhibiting effect upon the polymerization of methyl vinylpyridine.

None of the acrylonitrile or the acrylate ester samples stabilized by the inhibitors listed in the tables above showed any discoloration when exposed to heat or light. It can be seen from these results that the compounds employed as stabilizers in this invention are extremely effective in overcoming the polymerization of acrylonitrile and acrylate esters in the presence of heat and/or light and under normal shipping and storage conditions.

The compositions of the instant invention present many advantages. Acrylonitrile and acrylate esters stabilized with the polymerization inhibitors of the present invention are free of objectionable color as well as auto-oxidation products and, therefore, have greater commercial value. When monomers containing the inhibitors of the present invention are polymerized with peroxides or redox catalyst systems, polymers of improved color are obtained since the inhibitors are colorless in the oxidized state. The acrylonitrile and acrylate esters may be stored or safely shipped over long periods of time without any deteriorating effects. The inhibiting agents are readily available and inexpensive and therefore, no great increase in cost is necessary.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

We claim:

1. A composition of matter consisting of a monomeric compound selected from the group consisting of acrylonitrile and acrylate esters having the general formula,

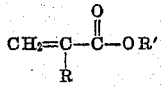

wherein R is selected from the group consisting of hydrogen and a methyl radical and R' is a saturated aliphatic hydrocarbon radical containing 1 to 8 carbon atoms, and as a polymerization inhibitor therefor, 0.01 to 10.0 percent, based on the total weight of said monomeric compound, of a compound selected from the group consisting of tri-phenyl phosphite and tri-p-tolyl phosphite.

2. A new composition of matter as defined in claim 1 wherein the monomeric compound is n-butyl methacrylate.

3. A new composition of matter as defined in claim 1 wherein the monomeric compound is methyl acrylate.

4. A new composition of matter as defined in claim 1 wherein the monomeric compound is methyl methacrylate.

5. A new composition of matter as defined in claim 1 wherein the monomeric compound is butyl acrylate.

6. A composition of matter consisting of a monomeric compound selected from the group consisting of acrylonitrile and acrylate esters having the general formula,

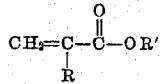

wherein R is selected from the group consisting of hydrogen and a methyl radical and R' is a saturated aliphatic hydrocarbon radical containing 1 to 8 carbon atoms, and as a polymerization inhibitor therefor, 0.5 to 2.0 percent, based on the total weight of said monomeric compound, of a compound selected from the group consisting of tri-phenyl phosphite and tri-p-tolyl phosphite.

7. A method for preparing a composition of matter consisting of dissolving in a monomeric compound selected from the group consisting of acrylonitrile and acrylate esters having the general formula,

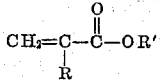

wherein R is selected from the group consisting of hydrogen and a methyl radical and R' is a saturated aliphatic hydrocarbon radical containing 1 to 8 carbon atoms, 0.01 to 10.0 percent, based on the weight of said monomeric compound, of a polymerization inhibitor selected from the group consisting of tri-phenyl phosphite and tri-p-tolyl phosphite, at a temperature in the range extending from the melting point up to the boiling point of said monomeric compound.

8. A method for preparing a composition of matter consisting of dissolving in a monomeric compound selected from the group consisting of acrylonitrile and acrylate esters having the general formula,

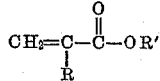

wherein R is selected from the group consisting of hydrogen and a methyl readical and R' is a saturated aliphatic hydrocarbon radical containing 1 to 8 carbon atoms, 0.5 to 2.0 percent, based on the weight of said monomeric compound, of a polymerization inhibitor selected from the group consisting of tri-phenyl phosphite and tri-p-tolyl phosphite, at a temperature in the range extending from the melting point up to the boiling point of said monomeric compound.

9. A method for preparing a composition of matter consisting of dissolving in acrylonitrile, 1.0 percent, based on the weight of said acrylonitrile of tri-phenyl phosphite at a temperature in the range extending from the melting point up to the boiling point of acrylonitrile.

References Cited in the file of this patent
UNITED STATES PATENTS

| | | |
|---|---|---|
| 2,234,379 | Martin | Mar. 11, 1941 |
| 2,299,128 | Codd et al. | Oct. 20, 1942 |
| 2,419,354 | Howland et al. | Apr. 22, 1947 |
| 2,437,232 | Rothrock et al. | Mar. 2, 1948 |

OTHER REFERENCES

Frank et al.: J.A.C.S. 68, 908 (1946).

UNITED STATES PATENT OFFICE
CERTIFICATE OF CORRECTION

Patent No. 2,932,661　　　　　　　　　　　　　　April 12, 1960

Charles H. Campbell et al.

It is hereby certified that error appears in the printed specification of the above numbered patent requiring correction and that the said Letters Patent should read as corrected below.

Column 2, line 63, Table I, third column thereof, first line, opposite "Acrylonitrile" strike out "0.10".

Signed and sealed this 11th day of October 1960.

(SEAL)
Attest:
KARL H. AXLINE
Attesting Officer

ROBERT C. WATSON
Commissioner of Patents